Aug. 16, 1966 F. M. MERRELL ETAL 3,267,460

SERIAL-PARALLEL MODE DIGITAL CONVERTER

Filed July 26, 1963 2 Sheets-Sheet 1

FRANCIS M. MERRELL
EDWARD A. HERRERA
INVENTORS.

BY Irving Kayton

ATTORNEY

Aug. 16, 1966 F. M. MERRELL ETAL 3,267,460

SERIAL-PARALLEL MODE DIGITAL CONVERTER

Filed July 26, 1963 2 Sheets-Sheet 2

FRANCIS M. MERRELL
EDWARD A. HERRERA
INVENTORS.

BY Irving Kayton
ATTORNEY

United States Patent Office 3,267,460
Patented August 16, 1966

3,267,460
SERIAL-PARALLEL MODE DIGITAL CONVERTER

Francis M. Merrell and Edward A. Herrera, Phoenix, Ariz., assignors to General Electric Company, a corporation of New York Filed July 26, 1963, Ser. No. 297,771
10 Claims. (Cl. 340—347)

Figure 1A:
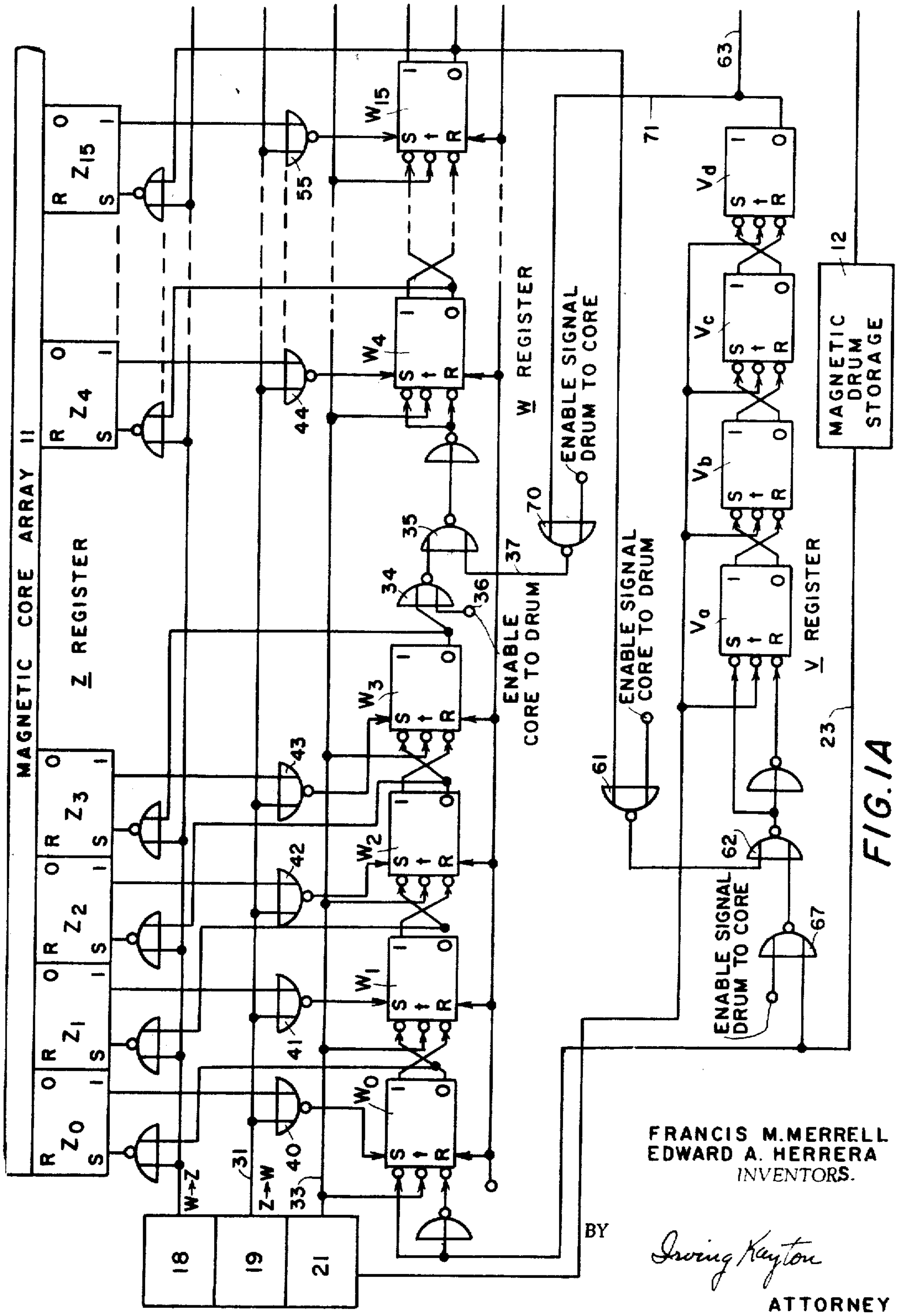

This invention relates to digital systems wherein a parallel array of digital information may be converted into a serial succession of that digital information, or the conversion may be in the reverse direction from serial to parallel, and more particularly, to such a system wherein the conversion process may occur over a longer interval of time than the inter-word time interval between successive digital words.

The term "word" is used in the accepted sense in the digital computer art, as a set of characters or bits (binary digits), disposed in either parallel or serial sequence, which is treated as a unit, particularly in storage transfer operations. The word length is equal to the number of characters or bits in the word. Although the word length may either be fixed or variable, depending upon the particular type of digital system used, the word length will be considered as fixed in this discussion for ease of exposition.

There are two basic modes of transmission of digital signals. One is the parallel mode, wherein the digital word has each bit or character of the word disposed on a separate transmission line such that there are as many lines to transmit the word as there are bits or characters in the word. The occurrence of each bit of the word is simultaneous in time with all the other bits, but is spatially spaced from all the other bits. The other mode is the serial mode wherein solely a single transmission line supports all the bits of the word in time succession. Thus, in observing the line at one spatial point, each of the bits of the words passes thereby as time elapses. Therefore, in the serial transmission of a word, the bits of the word are transferred in time succession over a single line, while in the parallel transmission of a word the bits of the word are transferred simultaneously over a set of lines.

In the digital computer art, some machines are inherently designed to operate primarily in the serial mode while others primarily are parallel machines. Some machines use parallel and serial modes in different subassemblies. Actually, it would be unusual if a digital computer primarily of one mode did not somewhere within its system also handle information in the other mode. A typical situation for example, occurs in a basically serial type of machine which requires conversion to the parallel mode in order to properly drive its output equipment, such as a printer or panel display, which is inherently responsive to the parallel mode. To provide for this mode change, from serial to parallel in this instance, conversion circuitry is required. The direction of conversion, however, may well be reversed in certain situations. Indeed, in some applications, reciprocal conversion may be required of the circuit. A specific example of this is a memory or storage system using a sequential-address magnetic drum in combination with a random-access magnetic core array. Typically, the magnetic core memory array functions as a parallel device, while the rotating magnetic drum functions as a serial device. Clearly, transfer from the drum to the core array requires a serial-to-parallel conversion, while in the reverse direction from core array to drum requires a parallel-to-serial conversion.

Reciprocal parallel-serial digital converters are well known in the art, and ordinarily the broad concept of that conversion provides no problems in computer design. However, in certain situations, such as in the drum-core system mentioned above, it may be appreciated that the magnetic core array is not in synchronism with the rotating drum and may function independently of the drum. Typically, the time domain of the magnetic core array is linked to the timing source of the computer, which may be a high frequency crystal-controlled oscillator, while the time domain of the magnetic drum is determined by the speed of rotation of its driving motor which in turn is a function of the 60 cycle input power line. With such diverse types of equipment and time domains it is understandable that precise synchronism may not be continuously provided. To provide and maintain constant synchronism between these two basically different forms of storage is neither practical nor feasible.

It may be understood from this, that the time between which a signal is presented to transfer information between the core array and the drum, and the time when the transfer may actually be instituted is a variable dependent upon the precise condition of the magnetic core and the precise location of the read or write head in the magnetic drum sector. If the maximum for this time interval due to this asynchronism is less than the inter-word time interval, then no serious problem need occur; however, if it is longer than the inter-word interval the words may overlap. It should be understood that the term inter-word time interval is the interval of time between the end of one word and the beginning of another word in the serial mode and the time required to transfer a word in the parallel mode. Assume, for example, that a request is made for a transfer of a word from the drum to the core array. Assuming that there is a word in the shift register of the parallel-serial converter, it may be seen that there need be no overlap between the word in the shift register and the word to be inserted in the shift register from the drum, if the core array is prepared to and can receive the word from the shift register within one inter-word time interval. Put more generally, the total time interval due to asynchronism plus the time required to transfer to the core array (which is a function of the switching time of the core memory) must be equal to an amount less than the inter-word interval or else, if nothing else is done, there will be overlap of successive words in the parallel-to-serial converter.

One solution to this difficulty is to lengthen inter-word interval so that overlap is prevented. However, a long inter-word interval is highly disadvantageous since it slows down the computing operation throughout the entire digital system. Another solution is to utilize extremely fast switching magnetic core arrays. This, however, requires purchasing an expensive magnetic core subassembly rather than a modestly priced array. Actually, except for the most expensive types of magnetic core arrays, the switching time of the magnetic core memories are relatively slow. In many cases, therefore, the sum of the time intervals due to asynchronism between the time domains of interest and due to transfer from the converter shift register to the magnetic core array, is often greater than an optimum inter-word time interval for that digital computer.

The undesirable consequence of this inter-word interval problem is, of course, the overlap of succeeding words in the conversion operation. Such a consequence, however, can be avoided by utilizing buffer storage in parallel with and disposed between the shift register of the parallel-serial converter and the input register of the magnetic core array. This of course solves the problem in manner well known in the art. However, such a prior art buffer storage in parallel with the shift register requires as many storage cells or flip-flops as the word which it must buffer has binary digits. It has been discovered that in accordance with the principles of the invention it is possible to have a truncated buffer storage which need not have a storage capacity coextensive with the word length. More particularly, it has been discovered that the maximum storage capacity in numbers of bit storage cells, e.g., flip-flops, of a buffer register functioning to prevent word overlap need be no greater than the difference between: the sum of the time interval (in bit times) due to asynchronism between the two time domains plus the transfer time from the serial register to the device of one of the time domains, e.g., magnetic core array, on the one hand, and the inter-word time interval on the other. More specifically, let us assume that $m$ in bit times is the maximum possible time interval due to asynchronism, $n$ in bit times is the total time required to transfer from the shift register of the parallel-serial converter to the equipment, and $i$ is the total bit times of the inter-word interval. Then the amount of truncated buffer storage B required need not (but may) be greater than $m$ plus $n$, minus $i$, i.e., $B=(m+n)-i$ is enough to prevent word overlap. It may be seen therefore that an important advantage in the truncated buffer storage in accordance with the invention over the prior art buffer storage is that there may be a saving in buffer storage capacity equal to $L-B$, where L is the word length in bits.

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings.

Figures 1B, 1C:
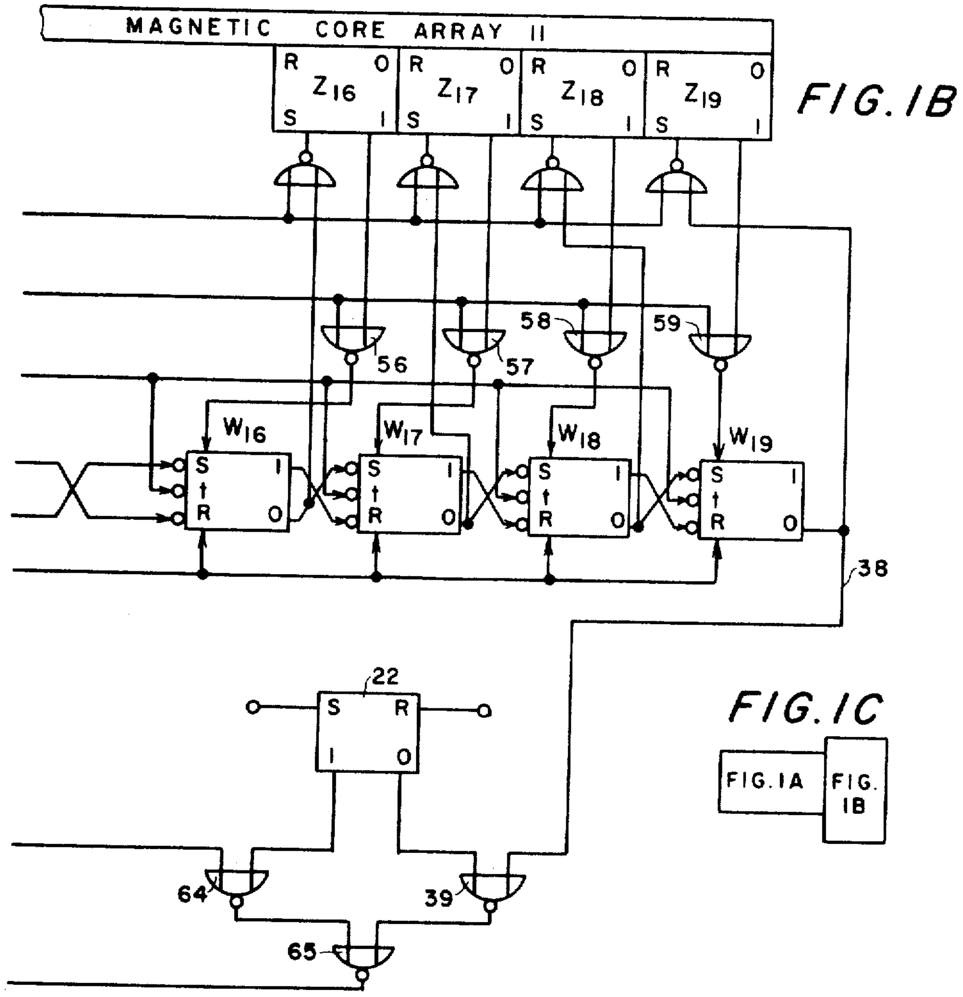

In the drawings:

FIGS. 1A and 1B, taken together as shown in 1C, comprise a logic circuit line drawing of a serial-parallel mode digital converter in accordance with the principles of the invention; and FIGS. 2 through 5 inclusive are logic circuit component representations as used in the digital logic circuit of FIG. 1.

Referring to FIGS. 1A and 1B, there is represented a parallel-serial digital converter in accordance with the principles of the invention, merely by way of example, and for purposes of illustration the converter shown is used in a digital system wherein the word length L is 20 bits. The number of bit times B in this system, may by way of example be equal to 4, i.e., $(m+n-i)=4$. Accordingly, the shift register W of the converter in this case comprises twenty flip-flops for storing twenty bits, and the truncated buffer V is a shift register comprising four flip-flops to store four bits.

The parallel-serial digital converter in this embodiment is for the purpose of providing a parallel-serial conversion between a magnetic core array 11 and a magnetic memory drum 12. The core array 11 and drum 12 are represented by blocks which may include hardware of a type well known in the art. Thus, for example, the magnetic core storage array may comprise the parallel type array well known in the art as disclosed in "Digital Computer Components and Circuits," by R. K. Richards, pp. 354–68, D. Van Nostrand and Company, Inc., New York, 1957. The magnetic drum for block 12 may be of the type disclosed in that same standard text at pages 336–42.

The heart of any parallel-serial converter is the shift register, and in this converter it is represented by the twenty flip-flops shift register W. Shift register W comprises flip-flops $W_0$ through $W_{19}$, with the broken lines indicating that some of the flip-flops are not actually shown, to conserve drawing space, but appear in the circuit. Twenty bit storage register Z is not a shift register, but provides storage used in the transfer of signals in the parallel mode between the W register and the magnetic core array 11. It comprises flip-flops $Z_0$ through $Z_{19}$. Logic circuitry in the form of NOR gates between the Z and W registers is used for the transfer of words in parallel mode between the two registers under the control of enabling pulses from pulse source 18 when the transfer is from the W register to the Z register. Pulse source 19 controls the transfer when the transfer is in the reverse direction, i.e., from the Z register to the W register. A third pulse source 21 is used for supplying the shift pulses to the W register for performing the shift function of that register. The truncated buffer storage register comprises the four bit shift register V which consists of flip-flops $V_a$, $V_b$, $V_c$ and $V_d$. Logic circuitry comprising flip-flop 22 and its associated NOR gates is used for the transfer from the W and V registers to magnetic drum 12.

It may be seen that the word to be transferred from drum 12 to core array 11 is applied as a serial input on lead 23 to registers W and V. A word to be transferred from core array 11 to drum 12 is applied from register Z (after its having been transferred to register Z from core 11), in parallel to register W along the parallel array of output leads from the $Z_0$ through $Z_{19}$ flip-flops, inclusive, Before considering the operation of the parallel-serial digital converter in transferring data between core array and drum, a description of the nature and mode of operation of the flip-flops, the shift register and logic NOR gates used in the circuit of FIGS. 1A and 1B will now be presented. Since these components are well known in the art, they will be but briefly described.

FIGS. 2 through 5 represent an unsteered flip-flop, a steered flip-flop, a NOR gate, and a shift register employing a multiplicity of steered flip-flops, respectively. In these logic circuits and components and in the other circuitry disclosed in the drawings, reference will be made to binary one and binary zero logic signals, and also to the change in state from binary one to binary zero, as being the signals implementing the action of the components. It is often the case that the specific hardware, which mechanizes logic components such as these, requires the logic signals to be in the form of two voltage levels. Thus, the binary one logic state may be represented by zero volts or ground, while the binary zero logic state may be represented by a positive voltage, for example, +6 volts. Changing from the binary one to the binary zero state results in a voltage change from zero to +6 and makes available the leading edge of the +6 volt pulse.

Figure 2:
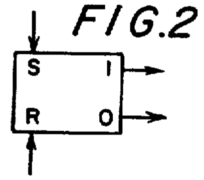

In FIG. 2, an unsteered flip-flop is represented. Very simply, the flip-flop is set by having a binary one input signal at input S, and is reset by a binary one signal at the reset input R. The outputs from the flip-flop in its set state are equal to binary one and binary zero at the one and zero output leads, respectively. The logic states of the one and zero output leads are reversed when the flip-flop is reset.

Figure 3:
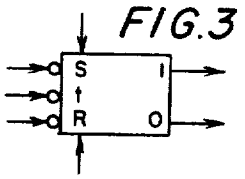
Figure 4:
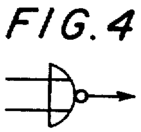

In FIG. 3, there is represented a steered flip-flop having three additional inputs which are the steering inputs. The steered flip-flop is set by the following conditions: a binary one at input S; or a binary zero at steered input S while the input at $t$ is changing from binary one to binary zero. The steered flip-flop is reset with a binary one at reset input R; or with a binary zero at steered input R while the input at $t$ is changing logic state from binary one to binary zero. The outputs of the steered flip-flop for the set and reset conditions are precisely the same as those described above with respect to the unsteered flip-flop. The logic NOR gate of FIG. 4, which is well known in the art, provides the following logic function: there is a binary one output on the NOR gate output lead only if both the inputs are simultaneously in the binary zero logic state, and concomitantly, the output is in logic state zero if either input is in the binary one state.

Figure 5:
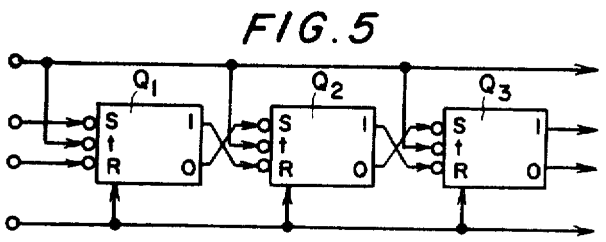

The purpose of a shift register such as that represented in FIG. 5 is to shift any arbitrary configuration of bits from flip-flop to flip-flop through the register. Let us assume that the shift register is of indefinite length and that flip-flops Q1, Q2 and Q3 are the first three stages. Each of these is a steered flip-flop of the type described above in FIG. 3. When a flip-flop is set, a binary zero is applied from the 0 output lead as an input to the steered set input S of the next flip-flop to the right because of the interconnection shown. Thus, when the signal applied on shift right trigger lead 26 changes from binary one to the binary zero state, the logic state of each flip-flop is shifted, or transferred, to the flip-flop at its right. At the same time, new information in the form of a binary state may enter flip-flop Q1, under the control of the signals on the trigger input lead *t* and the steered input R. The unsteered inputs to the flip-flops of the shift register are connected by lead 28 and function as a reset input to every flip-flop in the register. However, the reset lead must be at zero volts or binary one to affect the flip-flops.

Returning to FIGS. 1A and 1B, consider now the transfer of a word from core array 11 to magnetic drum 12. Let us assume that the instructions requesting the transfer have been executed, and in accordance with the priority schedule of the computer in which the converter of FIGS. 1A and 1B is included, the transfer has been deemed appropriate priority-wise, and the time domains of the core array 11 and the magnetic drum 12 have been synchronized for the commencement of the transfer. At this point the word to be transferred from core array 11 is already loaded in register Z with each of the twenty characters of the word disposed in the twenty flip-flops $Z_0$ through $Z_{19}$. Commencement of the transfer from the Z register to the shift register W occurs with the application of the Z to W enabling pulse applied on the common lead 31 from the appropriate pulse source 19. The simultaneous application of the enabling pulse to the NOR gates 40 to 59 inclusive, gates the word from the Z register to the W register (which was previously reset) with the corresponding $Z_0$ through $Z_{19}$ flip-flops communicating with the corresponding $W_0$ through $W_{19}$ flip-flops. The outputs of the NOR gates 40 through 59 are applied as the input leads to the respective flip-flops as the set input leads. Accordingly, if a binary one is in the $Z_0$ flip-flop, a binary one will be transferred to the $W_0$ flip-flop, and similarly for all of the flip-flops in the Z and W registers. On completion of the loading of the W register by transfer from the Z register, the Z register may be reset with a reset pulse applied in the manner described above with respect to resetting unsteered flip-flops. The next word from core array 11 may be then loaded in the Z register. At this point, it should be understood that the word of interest is in the W register, but there has thus far been no transfer of any portion of the word into the truncated buffer storage register V.

Shifting of the word in the W register, flip-flop by flip-flop, to the right from $W_0$ through $W_{19}$ is then commenced. Consider for the purpose of convenience in notation that when the W register has just been loaded from the Z register, the bit in the $W_0$ flip-flop is termed the zero bit, in the $W_1$ register the number one bit, and so on up to the $W_{19}$ flip-flop which holds bit number 19 (which is the leading bit of that twenty bit word). A train of sixteen sequentially appearing shift pulses is applied from pulse source 21 to shift $W_{0-19}$ lead 33, each one of which triggers each of the W register flip-flops to accomplish the step-by-step shifting of the word to the right in manner previously described relative to FIG. 5.

It may be noted that the output of the $W_3$ flip-flop, unlike the outputs of the other flip-flops in the W register, is not applied directly to its next adjacent flip-flop $W_4$, but is applied to NOR gate 34, the output of which, in turn, is applied as an input to NOR gate 35 whose output is then applied as the input to the $W_4$ flip-flop. Lead 36 to NOR gate 34 may have applied thereto an enabling signal which permits the transfer of bits from $W_3$ through NOR gate 34 and thence through NOR gate 35 to flip-flop $W_4$ during a core to drum conversion or word transfer. As will be seen for the reverse direction of transfer, i.e., from drum to core array, NOR gate 35 has its input lead 37 enabled and permits the transfer of bits to the $W_4$ flip-flop not from $W_3$, but from the V register. However, for the core array to drum transfer as previously indicated, the enabling signal on lead 36 permits the bit-by-bit serial transfer from the $W_0$ through $W_3$ flip-flops to the $W_4$ flip-flop. It may be appreciated that as the W register is shifting bit by bit to the right, these bits are exiting the W register from the $W_{19}$ flip-flop output. Thus, for example, when the very first shift pulse is applied on lead 33 to the W register, bit number zero shifts from the $W_0$ flip-flop to the $W_1$ flip-flop, and so on down the line; of course, bit number nineteen, which had been in the $W_9$ flip-flop, is shifted out on output lead 38 to the NOR gate 39. This is repeated with each of the shift pulses that are sequentially applied from source 21 on the W register shift lead 33. At the time that bits from the $W_{19}$ flip-flop are exiting the W register to NOR gate 39, flip-flop $W_{15}$ applies its output to NOR gate 61 and in turn through NOR gate 62 to the V register. An enabling signal is applied as the second input to NOR gate 61 during the core to drum transfer operation. Consequently when the very first shift pulse from source 21 is applied to the W register shift lead 33 and bit number nineteen is exiting flip-flop $W_{19}$, bit number fifteen simultaneously is exiting flip-flop $W_{15}$ and is being applied to NOR gate 61 and ultimately, to flip-flop $V_a$ of the V register. All of the bits that exit flip-flop $W_{15}$, therefore, are applied through NOR gates 61 and 62 to the V register, which, as it may be recalled, is also a shift register. It follows, therefore, that the V register shifts its pulses from $V_a$ through $V_b$ through $V_c$ through $V_d$ to output lead 63 and to NOR gate 64. Every bit that comes out of flip-flop $W_{15}$ is applied both to $W_{16}$ of the W register and flip-flop $V_a$ of the V register, and therefore $W_{16}$ through $W_{19}$ function in parallel with the V register.

The significance of this parallel operation can now be understood by referring to the NOR gates 39 and 64. The bit applied from $W_{19}$ to NOR gate 39 at any time is the same as the bit applied from $V_d$ to NOR gate 64. The outputs of NOR gates 39 and 64 are applied as the two inputs to NOR gate 65. The second inputs to NOR gates 64 and 39 are the one and zero outputs of the flip-flop 22. Thus, the state of flip-flop 22, which is an unsteered flip-flop, determines whether it will be the signals from NOR gate 39 that are gated to the magnetic drum 12 or the signals from NOR gate 64. During the major portion of the operating time, the state of flip-flop 22 is such that the signals exiting through flip-flop $W_{19}$ are the ones which are gated through to magnetic drum 12. However, when the state of flip-flop changes, it is the output of $V_d$ that is gated through to magnetic drum 12, while the output from NOR gate 39 (and therefore from $W_{19}$) is blocked and not permitted to enter the magnetic drum.

The significance of such an arrangement may now be understood. Suppose the shift register which had a word loaded therein from the Z register has had sixteen shift pulses sequentially applied on its shift lead 33, so that the word has had sixteen of its bits shifted out from $W_{19}$ through the NOR logic 39 and 65 to magnetic drum 12. This means that bit numbers zero through three are presently located in the $W_{16}$ through $W_{19}$ flip-flops of the W register, and are also located in the $V_a$ through $V_d$ flip-flops of the V register. This being the case, it is possible now to simultaneously change the state of flip-flop 22 to gate the V register to the drum, and clear (reset) the W register completely, preparatory to its receiving another word from the Z register, without losing or overlapping the bits numbered zero through three, since bits zero through three continue to be shifted through the V register and applied to magnetic drum 12 even though register W has been cleared. While these last four bits are still being shifted from register V into the magnetic drum, the W register is being reloaded with a word from the Z register. In this way, overlap of successive word transfers from core array 11 is completely avoided, but the V register need be no larger than four bits in storage capacity.

Now let us consider transfer of a word from the magnetic drum 12 to core array 11, which represents a serial-to-parallel conversion rather than a parallel-to-serial conversion as was previously accomplished in the core to drum transfer. In this arrangement, synchronism between the core and drum time domains is not accomplished at the commencement of the transfer and conversion. A twenty bit serially appearing word is applied from magnetic drum 12 on its output lead 23 and is thence applied to both the W and V registers with the leading bit, bit number nineteen of the word applied in parallel to both the $W_0$ flip-flop and the $V_a$ flip-flop of the two registers. For this drum to core transfer, it may be appreciated that an enabling signal for the drum to core operation is applied to NOR gate 67, which effectively constitutes the input NOR gate for the V register during a drum to core transfer. Also during this operation, flip-flop 22 may be placed in its set state, thereby precluding the possibility of any output from flip-flop $V_d$ of the V register recirculating back to the magnetic drum (alternatively the write amplifier of the drum may be controlled to produce the same result). Furthermore, an enabling signal for the drum to core transfer is applied as one input to NOR gate 70 whose output lead 37 is applied as the input to NOR gate 35. Thus, the output lead 71 of flip-flop $V_d$ is applied as a second input to NOR gate 70 and with the enabling signal for the drum to core transfer applied as the other input to NOR gate 70. As the V register is shifted, therefore, its contents are transferred serially to the $W_4$ flip-flop of the W register. Although the $W_0$ through $W_3$ flip-flops of that register function in parallel with the $V_a$ through $V_d$ flip-flops of the V register, $W_3$ does not transfer to $W_4$ since the enabling signal to the NOR gate 34 at the output of the $W_3$ flip-flop does not exist (this enabling signal occurs only in a core to drum transfer). Therefore, it is the output of the V register alone that is utilized in the $W_4$ through $W_{19}$ flip-flops as the shifting progresses.

The shifting of the W and V registers continues on for twenty shift pulses until the W register is loaded with the number zero through number nineteen bits. At that time, the V register is loaded with the number zero through number three bits, paralleling the contents of the $W_0$ through $W_3$ flip-flops. If the transfer from register W to register Z could then be made within the inter-word time interval, the transfer from register W to register Z could be achieved before the leading bit of the next word coming from magnetic drum 12 arrives at the $W_0$ flip-flop, then no problem would ordinarily exist, and the V register would in fact be unnecessary. However, since the synchronism of the time domains of the core array and the magnetic drum must be achieved at the time when the W register is loaded, and since this synchronism may not be instantaneously possible since it is a function of the state of the core array and the sector position of the drum, the resulting delay plus the finite switching time of the core array may combine to result in the leading bit of the next word from drum 12 appearing at the $W_0$ flip-flop before the transfer may be completed from register W to register Z.

The truncated buffer storage register V saves the situation and prevents overlap. The first four bits of the word exiting the drum are loaded into the V register, which will accept them from the magnetic drum whether or not the W register will accept them. The V register continues shifting to the right as the word enters it. However, by the time the bit number nineteen is in the $V_d$ flip-flop, synchronism has, of necessity, been obtained and the transfer from the W register to the V register will have been completed. Thus, when bits numbered 16 through 19 are in the $V_a$ through $V_d$ flip-flops, respectively, the W register has been cleared. On the next shift pulse to the V register, which is now also applied on lead 33 to the W register, bit number 19 exits $V_d$ and enters $W_4$, while bit number 15 from the magnetic drum simultaneously and in parallel enters $V_a$ of the V register and $W_0$ of the W register. With sixteen more shifts then, the situation is once more established wherein bits numbered zero through nineteen fully occupy the W register and bits zero through three occupy the V register in parallel with the $W_0$ through $W_3$ flip-flops.

From this description of the serial-to-parallel converter, it may be seen that for both conversion directions, the truncated buffer storage V register plays an important function relative to the W shift register. For the core array to magnetic drum transfer which is a parallel-to-serial conversion, the V register operates in parallel with the $W_{16}$ through $W_{19}$ flip-flops of the W register, while in the reverse direction from magnetic drum to core array which provides a serial-to-parallel conversion, the V register operates in parallel with the $W_0$ to $W_3$ flip-flops to provide the appropriate buffering action.

While the principles of the invention have now been made clear in illustrative embodiments, there will be immediately obvious to those skilled in the art many modifications in structure, arrangement, proportions, the elements, materials and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to be secured by Letters Patent of the United States is:

1. A serial-parallel mode digital converter, comprising: parallel mode means for producing an output word in the parallel mode or for receiving a word in the parallel mode, or both; serial mode means for producing an output word in the serial mode or for receiving a word in the serial mode, or both; a first shift register having a storage capacity of L bits connected between said parallel mode means and said serial mode means; and a second shift register having a storage capacity of B bits, where B is a smaller number than L, said second shift register being connected in parallel with a portion of said first shift register.

2. A serial-parallel mode digital converter as recited in claim 1, wherein said parallel mode means is a magnetic core storage array, and said serial mode means is a magnetic storage drum.

3. A serial-parallel mode digital converter as recited in claim 1 including pulse means for simultaneously shifting said first and second shift registers for a multiplicity of shifts.

4. A serial-parallel mode digital converter as recited in claim 1 wherein said first shift register comprises a series of L flip-flops and said second shift register comprises a series of B flip-flops, and including pulse means for simultaneously shifting both said shift registers for at least B shifts.

5. A serial-parallel mode digital converter as recited in claim 4 including logic and switching means for disposing said second shift register in parallel with the first B flip-flops of said first shift register for one direction of serial-parallel mode conversion and for disposing said second shift register in parallel with the last B flip-flops of said first shift register for the other direction of serial-parallel conversion.

6. A serial-parallel mode digital converter as recited in claim 1 wherein the inherent transfer time $n$ in bit times between said parallel mode means and said first register plus the maximum time $m$ in bit times required to synchronize the time domains of said parallel and serial mode means, are additively greater than the interword time interval $i$ in bit times for words operated upon in said digital converter.

7. A serial-parallel mode digital converter as recited in claim 6 wherein the capacity B in bits of said second shift register is at least as large as $(m+n-i)$.

8. A serial-parallel mode digital converter comprising: a first shift register having a storage capacity of L bits; and a second shift register having a storage capacity of B bits, where B is a smaller number than L, said second shift register being connected in parallel with a portion of said first shift register.

9. A serial-parallel mode digital converter as recited in claim 8 wherein said first shift register comprises a series of L flip-flops and said second shift register comprises a series of B flip-flops, and including pulse means for simultaneously shifting both said shift registers for a multiplicity of shifts.

10. A serial-parallel mode digital converter as recited in claim 9 including logic and switching means for disposing said second shift register in parallel with the first B flip-flops of said first shift register for one direction of serial-parallel mode conversion and for disposing said second shift register in parallel with the last B flip-flops of said first shift register for the other direction of serial-parallel conversion.

References Cited by the Examiner

UNITED STATES PATENTS

| | | | |
|---|---|---|---|
| 3,060,414 | 10/1962 | Dirks | 340—174.1 |
| 3,090,034 | 5/1963 | Fredericks et al. | 340—172.5 |
| 3,156,815 | 11/1964 | Smeltzer | 235—164 |

MAYNARD R. WILBUR, *Primary Examiner.*

A. L. NEWMAN, MALCOLM A. MORRISON, *Examiners.*